(12) United States Patent
Hulick, Jr.

(10) Patent No.: US 12,463,878 B2
(45) Date of Patent: Nov. 4, 2025

(54) OBSERVABILITY DATA TRACE SAMPLING BASED ON INFRASTRUCTURE HEALTH AND SITUATIONAL AWARENESS

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 18/416,143

(22) Filed: Jan. 18, 2024

(65) Prior Publication Data

US 2025/0240226 A1 Jul. 24, 2025

(51) Int. Cl.
*H04L 43/024* (2022.01)
(52) U.S. Cl.
CPC ................... *H04L 43/024* (2013.01)
(58) Field of Classification Search
CPC ..................................... H04L 43/024
USPC ....................................... 709/224
See application file for complete search history.

(56) References Cited

U.S. PATENT DOCUMENTS

| | | | |
|---|---|---|---|
| 2016/0234087 A1* | 8/2016 | Nyerges | H04Q 9/00 |
| 2020/0028771 A1* | 1/2020 | Wong | H04L 43/067 |
| 2021/0218658 A1* | 7/2021 | Vasseur | H04L 41/149 |
| 2022/0038902 A1* | 2/2022 | Mueck | H04L 63/1433 |
| 2022/0050902 A1* | 2/2022 | Hulick, Jr. | G06F 11/3006 |
| 2022/0358424 A1 | 11/2022 | Kulkarni et al. | |
| 2022/0417117 A1* | 12/2022 | Tayeb | H04L 41/28 |
| 2023/0017175 A1 | 1/2023 | Song et al. | |
| 2023/0118838 A1 | 4/2023 | Hulick | |

FOREIGN PATENT DOCUMENTS

CN 117155812 A * 12/2023 ........... H04L 43/022

OTHER PUBLICATIONS

CNCF: "CNCF Projects are the Foundation of Cloud Native Computing", retrieved on Jan. 22, 2024, 10 pages.
Github: "Monitoring", Opentelemetry-Collector, retrieved on Jan. 22, 2024, 2 Pages.

(Continued)

*Primary Examiner* — Wing F Chan
*Assistant Examiner* — John Fan
(74) *Attorney, Agent, or Firm* — Lee & Hayes, P.C.; James M. Behmke (57) ABSTRACT

In one embodiment, a method can include exchanging, by a first end device with a second end device, telemetry traces that are associated with spans of observability information within a computer network at a sampling configuration, the first end device being one of either an exporter head-end device or a collector tail-end device. The method can further include determining, by the first end device, one or more current situational factors of one or more of the exporter head-end device, the collector tail-end device, or the computer network and determining, by the first end device, a trigger to dynamically adjust the sampling configuration to a new sampling configuration based on the one or more current situational factors. The method can further include causing, by the first end device, the exporter head-end device to exchange the telemetry traces according to the new sampling configuration.

20 Claims, 5 Drawing Sheets

(56) References Cited

OTHER PUBLICATIONS

Github: "OpenTelemetry Collector Observability", retrieved on Jan. 22, 2024, 4 pages.
Github: "Tail Sampling Processor", Opentelemetry-collector-contrib, retrieved on Jan. 22, 2024, 9 Pages.
Github: "Tracing API", Opentelemetry-Specification, Retrieved on Jan. 22, 2024, 15 Pages.
Github: "Troubleshooting", Opentelemetry-Collector, Jan. 22, 2024, 6 pages.
Opentelemetry: "Scaling the Collector", Jan. 22, 2024, 9 Pages.
Opentelemetry: "What is OpenTelemetry?", Retrieved on Jan. 22, 2024, 3 Pages.

* cited by examiner

OBSERVABILITY DATA TRACE SAMPLING BASED ON INFRASTRUCTURE HEALTH AND SITUATIONAL AWARENESS

TECHNICAL FIELD

The present disclosure relates generally to computer systems, and, more particularly, to observability data trace sampling based on infrastructure health and situational awareness.

BACKGROUND

Sampling observability data (e.g., telemetry data, such as OpenTelemetry (OTEL) data), can present various challenges. One such challenge is that it can be very difficult to dynamically alter the sampling rate for observability data, particularly based on the health of the infrastructure from which the observability data is being sampled. That is, it can be challenging to increase (or decrease) the rate at which observability data is sampled based on infrastructure health characteristics such as bandwidth and/or in response to changing conditions in various observability sampling components, such as agents (e.g., observability agents, OTEL agents, etc.), collectors (e.g., observability collectors, OTEL collectors, etc.), and/or receivers (e.g., observability receivers, OTEL receivers, etc.). It is noted, however, that the rate at which the observability data (e.g., the trace sampling rate) plays a major role in the integrity of the observability pipeline (e.g., of the OTEL pipeline) and therefore may be of interest to operators and/or users of systems in which observability data is collected.

In general, sampling of observability data is either on or off (e.g., activated or deactivated), with very little ability to dynamically alter attributes of the sampling. One exception to this is that it can be possible in certain circumstances to employ a brute force approach to limit the sampling rate. However, these techniques are generally not very effective and may be costly in terms of resource consumption.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more implementations of the disclosure, a method can include exchanging, by a first end device with a second end device, telemetry traces that are associated with spans of observability information within a computer network at a sampling configuration, the first end device being one of either an exporter head-end device or a collector tail-end device. The method can further include determining, by the first end device, one or more current situational factors of one or more of the exporter head-end device, the collector tail-end device, or the computer network and determining, by the first end device, a trigger to dynamically adjust the sampling configuration to a new sampling configuration based on the one or more current situational factors. The method can further include causing, by the first end device, the exporter head-end device to exchange the telemetry traces according to the new sampling configuration.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
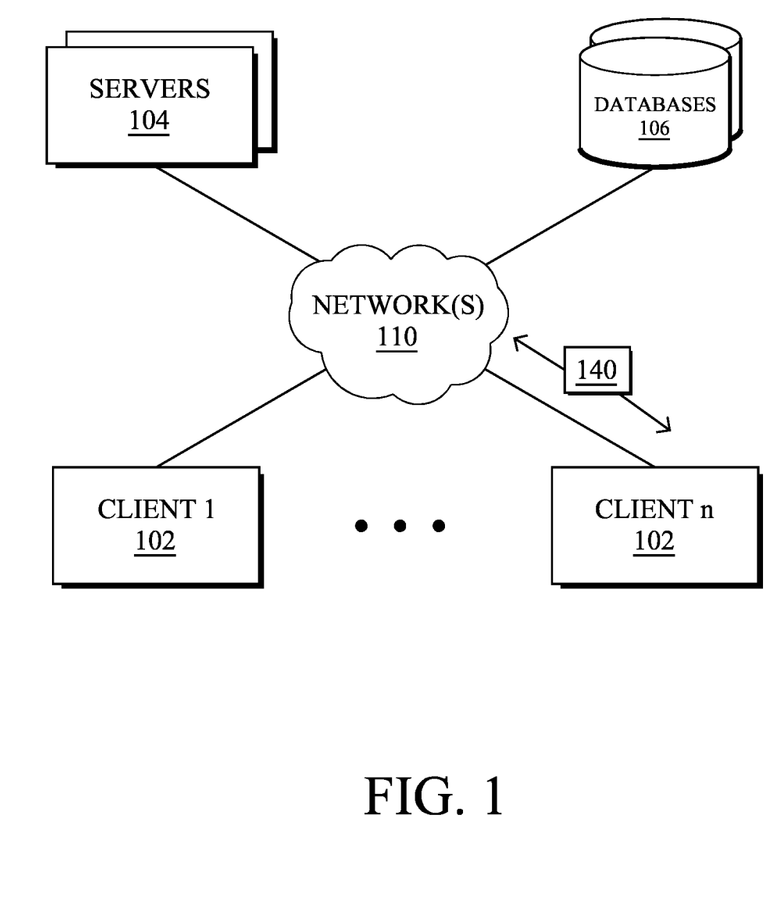
FIG. 1 illustrates an example computer network.

FIG. 1 is a schematic block diagram of an example of a computing system 100 that includes client devices 102 (e.g., any number of client devices such as a first through nth client device), one or more servers 104, and one or more databases 106, where the devices may be in communication with one another via any number of networks (e.g., network (s) 110). The network(s) 110 may include, as would be appreciated, any number of specialized networking devices such as routers, switches, access points, etc., interconnected via wired and/or wireless connections. For example, client devices 102 and/or one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or one or more databases 106, including any number of other suitable devices (e.g., firewalls, gateways, and so on) may be part of a cloud-based service. In such cases, the servers and/or one or more databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
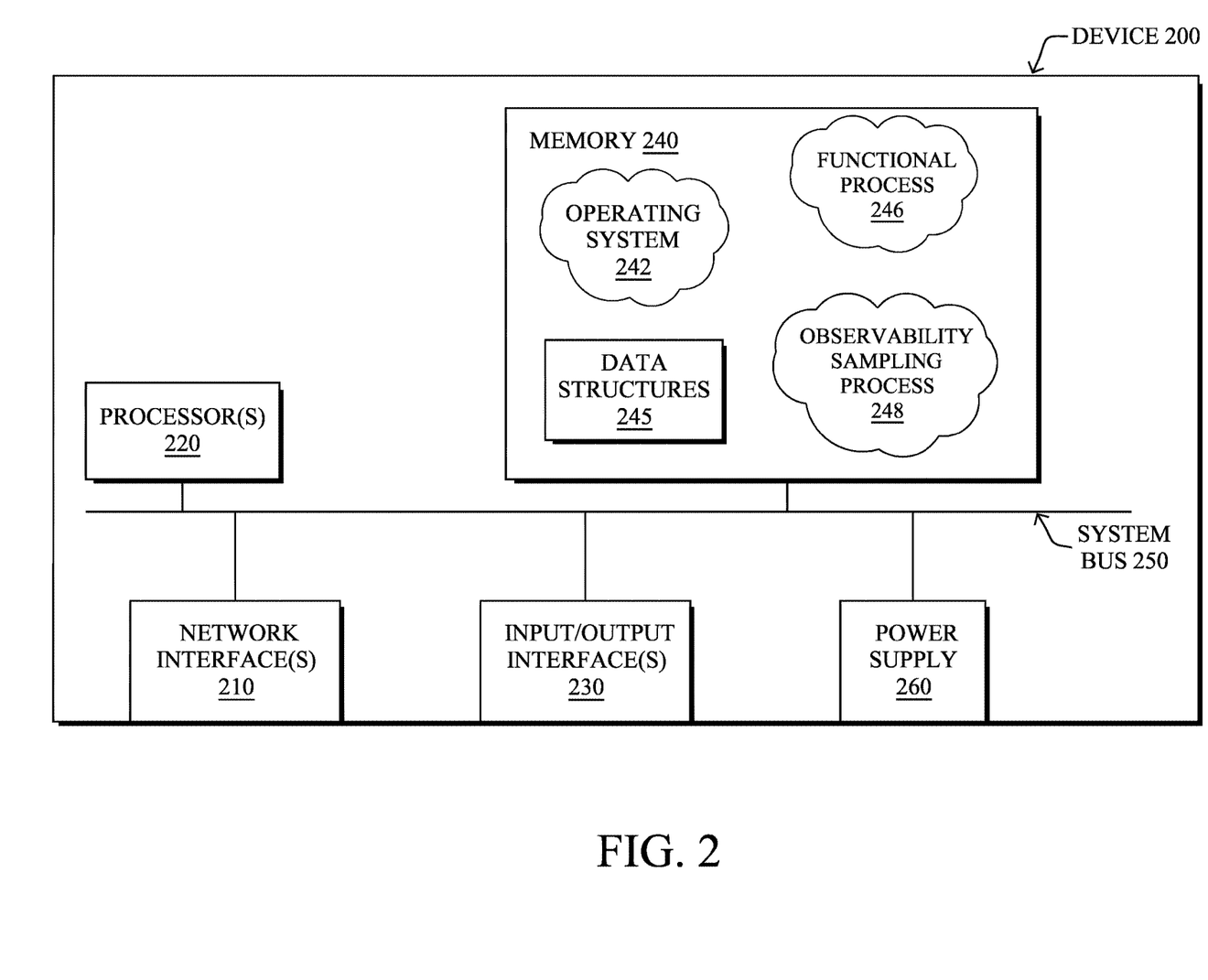
FIG. 2 illustrates an example computing device/node.

FIG. 2 is a schematic block diagram of an example node/device 200 that may be used with one or more implementations described herein, e.g., as any of the devices shown in FIG. 1 above. Device 200 may comprise one or more network interfaces (e.g., wired, wireless, etc.), a processor 220 (e.g., one or more processors), and a memory 240 interconnected by a system bus 250, as well as a power supply 260 (e.g., battery, plug-in, etc.).

The network interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise functional processes 246 (e.g., one or more functional processes), and on certain devices, an observability sampling process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet)

through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
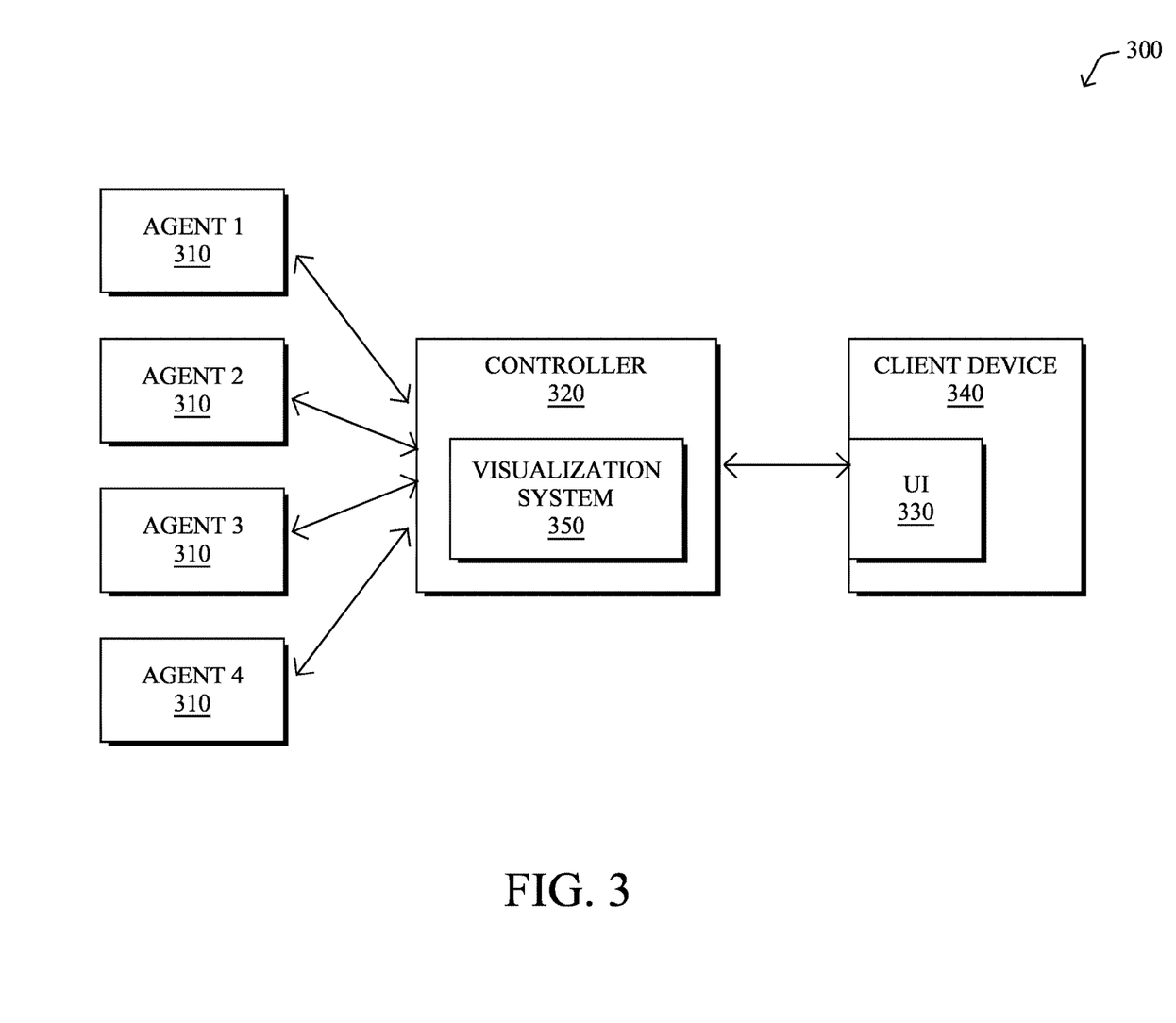
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes agents 310 (e.g., one or more agents) and one or more servers and/or controllers (e.g., the controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve an interface 330 (e.g., a browser-based user interface (UI)) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance may be hosted remotely by a provider of the observability intelligence platform 300. In an illustrative on-premises (On-Prem) implementation, a controller instance may be installed locally and self-administered.

The controller 320 receives data from the agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Observability Data Trace Sampling Based on Infrastructure Health and Situational Awareness——

As noted above, sampling observability data (e.g., telemetry data, such as OpenTelemetry (OTEL) data), can present various challenges. For example, it can be very difficult to dynamically alter the sampling rate for observability data, particularly based on the health of the infrastructure from which the observability data is being sampled. Further, providing situational awareness to a system that samples observability data (e.g., the ability to increase (or decrease) the rate at which observability data is sampled) in response to changing conditions in various observability sampling components can also be very difficult. These and other issues can be problematic because the rate at which the observability data (e.g., the trace sampling rate) plays a major role in the integrity of the observability pipeline (e.g., of the OTEL pipeline).

In general, sampling of observability data is either on or off (e.g., activated or deactivated), with very little ability to dynamically alter attributes of the sampling. One exception to this is that it can be possible in certain circumstances to employ a brute force approach to limit the sampling rate. However, as mentioned above, these techniques are generally not very effective and may be costly in terms of resource consumption.

Some other approaches may attempt to improve sampling of observability data using what may be referred to as a "tail-based sampling approach." In the tail-based sampling approach, a collector (e.g., an observability data collector, such as an OTEL collector) can sample the observability data in accordance with one or more of the following policies:

An "always_sample" policy in which all observability (e.g., all traces) are constantly sampled;

a "latency" policy in which sampling is performed based on the duration of the trace. In this policy, the duration of the trace is generally determined by looking at the earliest start time and latest end time, without taking into consideration what happened in between the earliest start time and latest end time;

a "numeric_attribute" policy in which the observability data is sampled based on a number of attributes (resource and record) associated with the traces;

a "probabilistic" policy in which a percentage of traces are sampled. This can be based on a comparison performed by a probabilistic sampling processor or other similar component;

a "status_code" policy in which observability data is sampled based on a status code (e.g., "OK," "RESET," "UNSET," etc.) associated with the traces;

a "string_attribute" policy in which observability data is sampled based on string attributes (resource and record) value matches. In these approaches, both exact and regex value matches can be supported;

a "trace_state" policy in which observability data is sampled based on TraceState value matches;

a "rate limiting" policy in which observability data is sampled based a sampling rate associated with the observability data;

a "span_count" policy in which the observability data is sampled based on a minimum and/or maximum number of spans, and may be inclusive of all spans. In these approaches, if the sum of all spans in the traces falls outside a range threshold, the trace will not be sampled;

a "boolean_attribute" policy in which the observability data is sampled based on a Boolean attribute (resource and record);

a "ottl_condition" policy in which the observability data is sampled based on a given Boolean OpenTelemetry Transformation Language (OTTL) condition being met (span and/or span event);

an "and" policy in which the observability data is sampled based on multiple policies of the above policies; and a "composite" policy in which the observability data is sampled based on a combination of the above policies, with ordering and rate allocation per sampler. In these approaches, rate allocation allocates certain percentages of spans per policy order. For example, if max_total_spans_per_second is set as a numerical value of one hundred, then the rate_allocation can be set based on the same.

It is noted that, in each of the policies above (e.g., in a tail-based sampling approach), the sampling of the observability data is performed in the collector (e.g., the OTEL collector). In addition, the sampling of the observability data in such approaches is performed based on application conditions found in the traces themselves. This means that all spans from a same transaction are required to be sent to the same collector in order to perform operations under the tail-based sampling approach.

In contrast, aspects of the present disclosure allow for observability data sampling decisions to be performed an agent (e.g., prior to the observability data being sent to the collector). In some implementations, "head sampling" techniques are employed by the agents and, as described in more detail herein, the collector can send messages to the agents to cause the rate at which the observability data is sampled to be altered. That is, in implementations of the present disclosure, the collector or root parent can make the decision to sample or not sample based on health characteristics of the collector, the agent(s), and/or the span creator (e.g., exporter component). In addition, implementations described herein can allow for the collector or root parent to make the decision to sample or not sample based on if there are reasons (e.g., based on the health characteristics) that observability data sampling should be escalated (or deescalated).

The techniques herein, therefore, provide intelligent, infrastructure health aware and situationally aware methodologies for performing observability data sampling. Stated alternatively, the techniques herein provide for dynamic alteration of the sampling rate of observability data (e.g., metrics, events, logs, and traces (or "MELT data") associated with OpenTelemetry data) based on health characteristics of the infrastructure, as well as components thereof. This can ensure that the quality of sampled observability data (e.g., MELT data, traces, spans, etc.) is maintained while ensuring that the observability system is not overwhelmed during periods of peak resource consumption.

Specifically, according to one or more implementations described herein a method can include exchanging, by a first end device with a second end device, telemetry traces that are associated with spans of observability information within a computer network at a sampling configuration, the first end device being one of either an exporter head-end device or a collector tail-end device. The method can further include determining, by the first end device, one or more current situational factors of one or more of the exporter head-end device, the collector tail-end device, or the computer network and determining, by the first end device, a trigger to dynamically adjust the sampling configuration to a new sampling configuration based on the one or more current situational factors. The method can further include causing, by the first end device, the exporter head-end device to exchange the telemetry traces according to the new sampling configuration.

Figure 4:
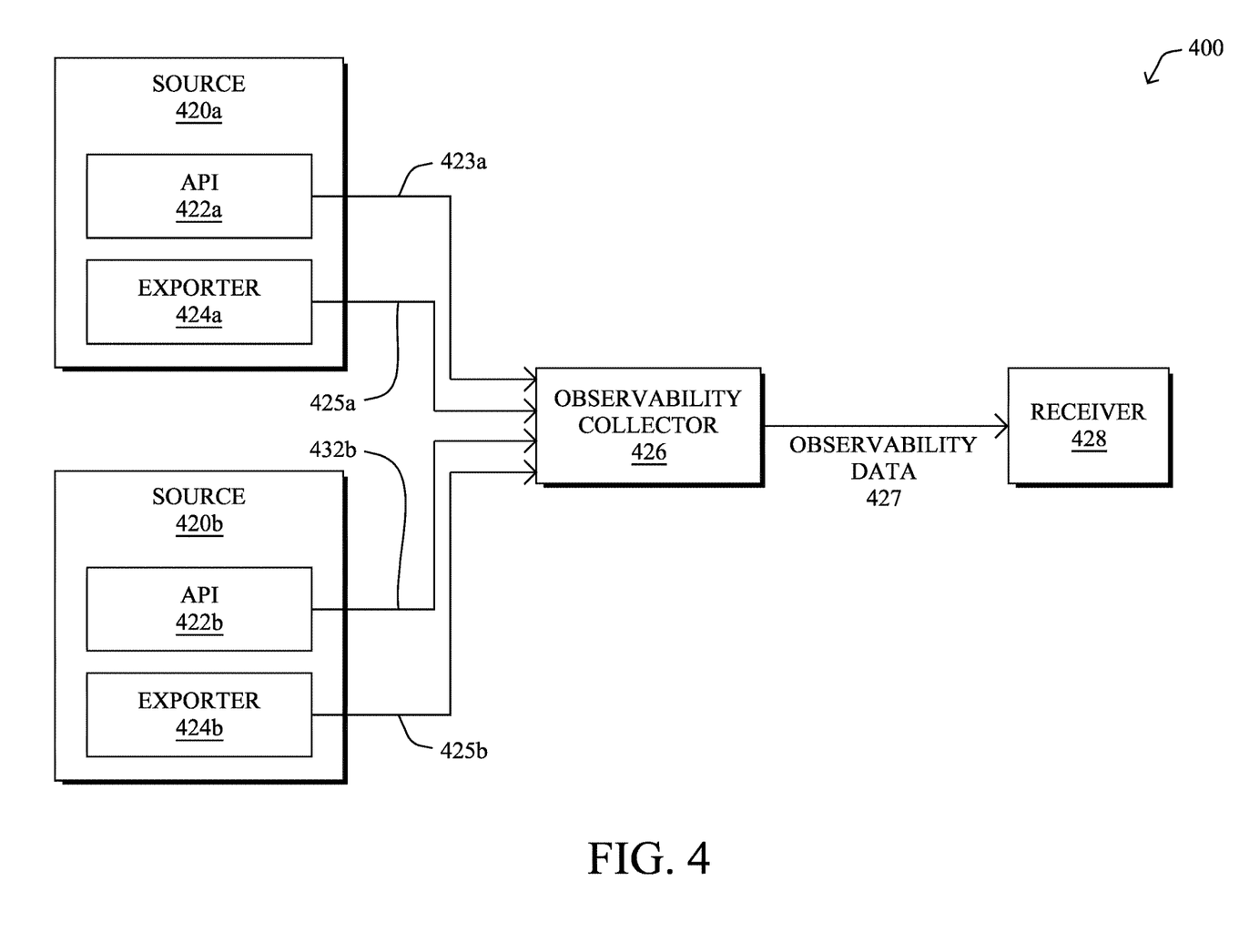
FIG. 4 illustrates an example system for observability data trace sampling based on infrastructure health and situational awareness in accordance with one or more implementations described herein.

Operationally, FIG. 4 illustrates an example system 400 for observability data trace sampling based on infrastructure health and situational awareness in accordance with one or more implementations described herein. As shown in FIG. 4, the example system 400 includes a plurality of sources, e.g., a first source 420a and a second source 420b. Although two discrete sources are illustrated in FIG. 4, implementations are not so limited and greater than or fewer than two sources may be included in the example system 400 without departing from the scope of the disclosure.

Each of the sources may include an application programming interface (API) and/or an exporter (e.g., a span creator/OTEL exporter). For example, the first source 420a can include a first API 422a and a first exporter 424a, and the second source 420b can include a second API 422b and a second exporter 424b. It is noted that, for purposes of this discussion, the terms "first" and "second" are used to associate the components to a respective source (i.e., the first API 422a and the first exporter 424a are associated with the first source 420a while the second API 422b and the second exporter 424b are associated with the second source 420b) and are not intended to refer to quantities unless otherwise specified.

As shown in FIG. 4, the first source 420a and the second source 420b are in communication with and observability collector 426. In some implementations, the first API 422a communicates observability data via a first communication path 423a while the second API 422b communicates observability data via a second communication path 423b. Similarly, the first exporter 424a communicates observability data vis a third communication path 425a while the second exporter 424b communicates observability data vis a fourth communication path 425b. The communication paths can be "restful," e.g., in some implementations one or more of the communication paths can be accessed programmatically using a Representational State Transfer (REST) protocol, although implementations are not so limited. One such example protocol is a remote procedure call protocol, such as the gRPC protocol. It will be appreciated that, according to the gRPC protocol, point-to-point function calls may be made over HTTP/2 as opposed to the HTTP 1.1 protocol. It will further be appreciated that other protocols besides REST and gRPC may be used in various implementations of the disclosure.

The observability collector 426 can be configured to receive information (e.g., telemetry information, MELT data, etc.) from the first source 420a and/or the second source 420b and provide observability data 427 to a receiver 428. In some implementations, the observability collector 426 is an API, although implementations are not limited to this specific architecture. The observability collector 426 can poll the sources, and/or the APIs and/or exporters associated with the sources to request information, such as observability information, telemetry data, MELT data, etc.

Once the observability collector 426 receives this information from the sources and/or the APIs and/or exporters associated with the sources, the observability collector 426 can generate observability data 427, such as OpenTelemetry metrics, among other observability data, from the information received from the sources and/or the APIs and/or exporters associated with the sources. As shown in FIG. 4, the observability collector 426 can then send the observability data 427 to the receiver 428.

In some implementations, the observability collector 426 can be an application that collects and/or processes observability data, such as metrics, events, logs, and/or traces (which can be referred to herein as "MELT" data) and sends the observability data to various destinations external to the example system 400. For example, the observability collector 426 can send the observability data to an observability ingest agent that is configured to receive the observability data from the observability collector 426 and transfer the observability data to MELT stream processing components.

The observability data may be presented as part of a trace. As will be appreciated, a trace a collection of linked spans, which are named and timed operations representing a unit of work in a request. A span may have a parent, or it can be a root span, which describes the end-to-end latency of the entire trace. Child spans represent sub-operations within the trace.

Although the information associated with these spans and, consequently, traces can offer valuable insights in application performance and behavior, among other attributes, the shear volume of information may become unwieldy. In addition, there may be situations in which not all every trace or even every span contains useful information and, accordingly, there may arise scenarios in which it would be beneficial to not sample each and every trace or even each span.

Sampling generally refers to the decision to keep a trace (and all associated spans) or not keep a trace (and all associated spans). By keeping a trace, it means sending all spans for that trace to the observability collector 426 to in turn be forwarded to a receiver. In modern architectures, where the receiver may be servicing thousands of nodes that are each generating multiple spans (potentially every second), the volume of information being sent to that receiver can quickly become quite large. This can in turn have an impact on the performance of the application, the sources, APIs, exporters, and the observability collector 426, not to mention the amount of storage that can be required to store all of these sampled traces.

The obvious solution to these issues would be to sample only the important traces; however, there is currently no way to determine which traces are important in real time. That is, currently the observability agent is unable to determine in real time which traces may be important and therefore either all traces processed by the observability agent are transferred to the observability collector or no traces are transferred to the observability collector. Further, using the observability collector to attempt to determine which traces are important is difficult at least because this would require buffering of the spans at the observability collector, which would require significant computing resources, not to mention that all the traces would need to be sent to a same observability collector, which may be associated with agents all over the world.

As mentioned above, in current approaches, sampling is either always on or always off, or is dynamically turned on and off. The control as to whether sampling is turned on or off is generally provided at the root span (e.g., the parent), which is the stating point of a given trace and, accordingly, downstream nodes have no control as to whether sampling is on or off. The exception to this can arise when a tail-based sampling approach (discussed above) that provides some control to downstream nodes is employed; however, these methodologies still only work when the sampling is performed by an observability collector that all the agents in the system have access to.

Accordingly, tail-based sampling approaches require that the observability collector receive and buffer the traces prior to making a determination as to whether the trace(s) is/are important or if the trace(s) can be discarded. This means that a significant amount of resources (e.g., in generating, transferring, receiving and/or buffering the traces) are expended if a particular trace is not sampled or not forwarded on to a receiver.

It is noted that, in these approaches, none of the decision-making criteria takes into account the available resources and/or the health (e.g., health characteristics) of the components of the example system 400 to create and/or process the trace sample. That is, the tail-based sampling approach is focused on span performance related attributes and therefore does not take into account situations where it may be beneficial to alter (e.g., increase) the sampling rate when an escalation in performance issues is detected, for example.

In order to address these and other deficiencies, the example system 400 of FIG. 4 is configured to perform decision-making with respect to sampling of traces using the observability collector 426. In addition, the observability collector 426 can be configured to employ a head sampling approach in contrast to the tail sampling approaches discussed above. In some implementations, the observability collector 426 can send responses to the first source 420*a* and/or the second source 420*b* to cause the first source 420*a* and/or the second source 420*b* to alter the rate (e.g., to escalate or deescalate) at which the traces are sampled. In some implementations, the responses can be HyperText Protocol (HTTP) response codes (e.g., a 429 response code, a 50× response code, etc.) that indicate issues involving upstream components. It will however be appreciated that other types of responses could be used without departing from the scope of the disclosure. This can allow for the root parent or collector to make the decision to sample or to not sample based on its health and/or based on the health of other components in the example system 400.

As mentioned above, the determination to alter the sampling rate can be based on health characteristics of the components of the example system 400. For example, the determination to alter the sampling rate can be based on health characteristics of the first source 420*a*, the second source 420*b*, the first API 422*a*, the second API 422*b*, the first exporter 424*a*, the second exporter 424*b*, and/or the observability collector 426.

In some implementations, the health characteristics of the first source 420*a*, the second source 420*b*, the first API 422*a*, the second API 422*b*, the first exporter 424*a*, and/or the second exporter 424*b* can be based on CPU usage and availability; memory usage and availability; network usage and availability; span creation; span forwarding load; span forwarding rate; observability collector response time (e.g., average response time, standard deviation response time, etc.); observability collector failure rate; and/or observability partial success rate.

In some implementation, the health characteristics of the observability collector 426 can be based on CPU usage and availability; memory usage and availability; network usage and availability; span ingestion load; span ingestion rate; receiver response time (e.g., average response time, standard deviation response time, etc.); receiver failure rate; and/or receiver partial success rate.

In some implementations, altering the rate of trace sampling (e.g., escalating or deescalating the sampling rate as a function of span performance) can be performed dynamically in various situations where increase (or decreased) sampling may be beneficial. Non-limiting examples of several such scenarios may include enabling recording on spans, increasing sampling rates, filtering problematic transaction types, etc.

In accordance with the disclosure and as shown in FIG. 4, observability data trace sampling based on infrastructure health and situational awareness can be performed by analyzing one or more metrics (e.g., the health characteristics) relating to the infrastructure of the example system 400 and/or the components of the example system 400 discussed above and altering sampling rate dynamically (e.g., on-the-fly) to alter the sampling rate of observability metrics within the example system 400. As mentioned above, the analysis can be performed by the first source 420*a*, the second source 420*b*, the first API 422*a*, the second API 422*b*, the first exporter 424*a*, and/or the second exporter 424*b*, and can be based on health characteristics of the observability collector 426, among other possibilities.

For example, the observability collector 426 can analyze trace performance metrics to determine in the sampling rate should be altered. In addition to, or in the alternative, the first source 420*a*, the second source 420*b*, the first API 422*a*, the second API 422*b*, the first exporter 424*a*, and/or the second exporter 424*b* can calculate round-trip response times based on upstream components, such as by calculating round-trip response times based on the observability collector 426. These round-trip response times can be indicative of issues experienced by the upstream components that could warrant alteration of the sampling rate.

Further, in some implementations, the observability collector 426 can analyze OpenTelemetry protocol (OTLP) responses that can be indicative of failures in receipt of traces and/or partial failures (or partial successes) in receipt of traces. In some implementations, the observability collector 426 can use this information to generate response codes (e.g., HTTP response codes such as a 429 response code, a 50× response code, etc.) that are indicative of issues on the upstream components of the example system 400.

Figure 5:
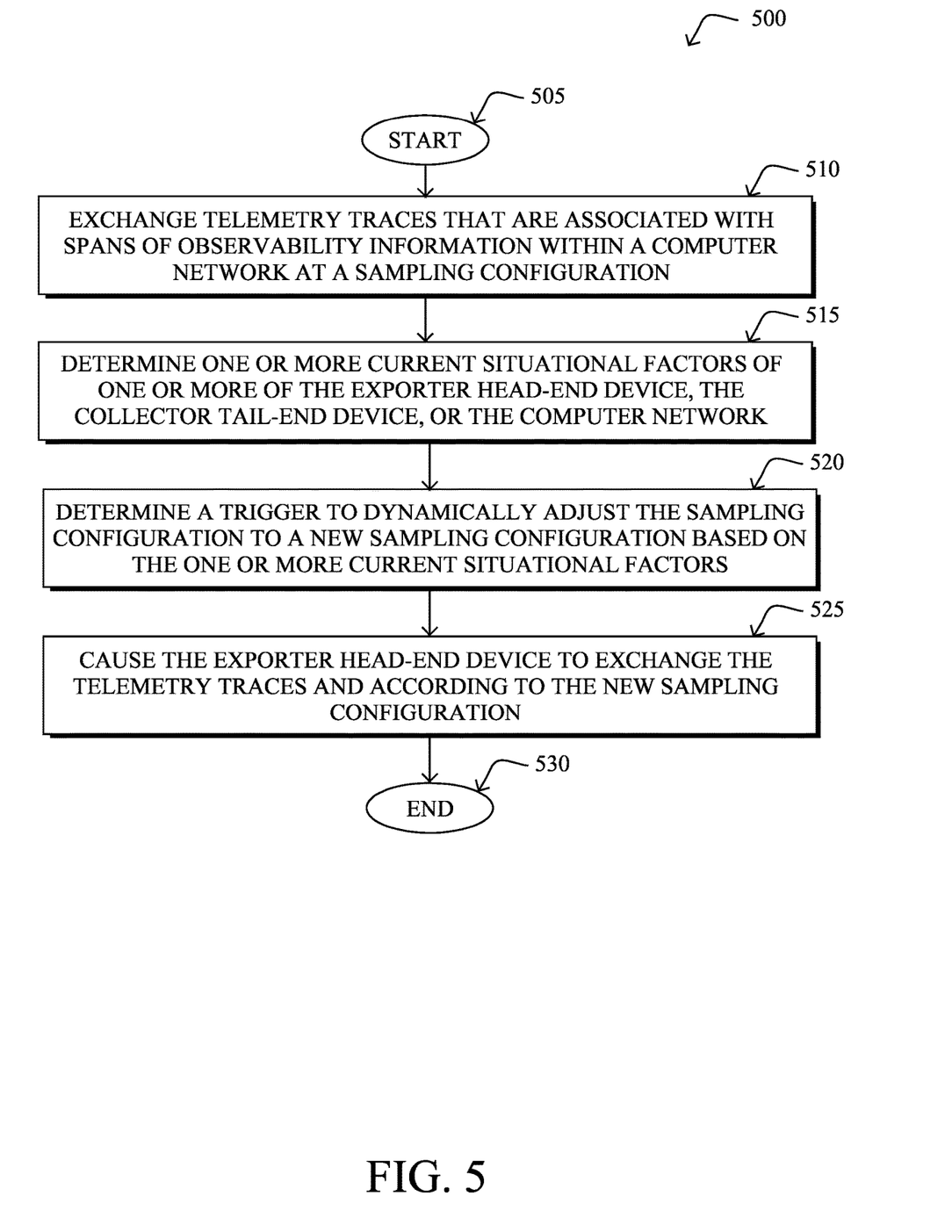
FIG. 5 illustrates an example simplified procedure for observability data trace sampling based on infrastructure health and situational awareness in accordance with one or more implementations described herein.

In closing, FIG. 5 illustrates an example simplified procedure for observability data trace sampling based on infrastructure health and situational awareness in accordance with one or more implementations described herein, particularly from the perspective of either an edge device or a controller. For example, a non-generic, specifically configured device (e.g., device 200) may perform procedure 500 by executing stored instructions (e.g., observability sampling process 248). The procedure 500 may start at step 505, and continues to step 510, where, as described in greater detail above, a first end device exchanges telemetry traces that are associated with spans of observability information with a second end device within a computer network at a sampling configuration. In some implementations, the first end device can be one of either an exporter head-end device or a collector tail-end device. As discussed above, the observability information can be OpenTelemetry (OTEL) data, metrics, events, logs, and traces (MELT) data, or any combination thereof.

At step 515, as described above, the procedure 500 determines, by the first end device, one or more current situational factors of one or more of the exporter head-end device, the collector tail-end device, or the computer network. In some implementations, the one or more current situational factors can include a health and/or a resource availability associated with the one or more of the exporter head-end device, the collector tail-end device, or the computer network. In such implementations, the procedure 500 can further include dynamically adjusting the sampling configuration to the new sampling configuration based on the health or the resource availability by increasing or decreasing a sampling rate of the telemetry traces. I.e., in some implementations, the new sampling configuration establishes one of either an increase or a decreasing to a sampling rate of the telemetry traces.

Implementations are not so limited, however, and in some implementations, the one or more current situational factors can include a prompt for additional data based on a level of escalation according to performance issues detected in the telemetry traces or the spans of observability data, or both. In such implementations, the prompt for additional data can be associated with one or more of: enablement of recording the spans of observability data, disablement of recording the spans of observability data, an increase in a sampling rate of the telemetry traces, a decrease in the sampling rate of the telemetry traces, filtering of collection of particular transaction types, or de-filtering of collection of particular transaction types.

At step 520, as described above, the procedure 500 determines, by the first end device, a trigger to dynamically adjust the sampling configuration to a new sampling configuration based on the one or more current situational factors. In some implementations, the one or more current situational factors can be selected from a group consisting of: round trip response times from components that indicate they are experiencing issues; OpenTelemetry responses that indicate failures or partial successes; collector scaling metrics; and collector health, among other possibilities.

At step 525, as described above, the procedure 500 causes, by the first end device, the exporter head-end device to exchange the telemetry traces according to the new sampling configuration by the first end device, the exporter head-end device to exchange the telemetry traces according to the new sampling configuration.

In some implementations, the first end device or the second end device can be either the exporter head-end device, a source, or an observability agent. In such implementations, the causing of step 525 may comprise causing the exporter head-end device to exchange the telemetry traces according to the new sampling configuration by adjusting one or more parameters associated with the exchange of the telemetry traces according to the new sampling configuration. Non-limiting examples of the one or more current situational factors can include, but are not limited to, central processing unit usage and availability of the exporter head-end device, memory usage and availability, network usage and availability of the exporter head-end device, span creation and forwarding loads and rates, response times, component failure occurrences associated with the exporter head-end device or the source, or partial success rates associated with the exporter head-end device or the source.

In yet other implementations, the first end device or the second end device can comprise the collector tail-end device and the causing of step 525 can include causing the exporter head-end device to exchange the telemetry traces according to the new sampling configuration by requesting that the exporter head-end device adjust one or more parameters associated with the exchange of the telemetry traces according to the new sampling configuration. In such implementations, the requesting can comprise sending of a hypertext transfer protocol response code message provided to the exporter head-end device. Further, non-limiting examples of the one or more situational factors can include, but are not limited to, central processing unit usage and availability of the collector tail-end device, memory usage and availability of the collector tail-end device, network usage and availability, span ingestion loads and rates, span forwarding loads and rates, response times, component failure occurrences associated with the collector tail-end device, or partial success rates associated with the collector tail-end device.

The procedure 500 may end at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprising one or more network interfaces to communicate with a network, a processor coupled to the one or more network interfaces and configured to execute one or more processes, and a memory configured to store a process that is executable by the processor. In such implementations, the process, when executed, may be configured to exchange, by a first end device with a second end device, telemetry traces that are associated with spans of observability information within a computer network at a sampling configuration, the first end device being one of either an exporter head-end device or a collector tail-end device, determine, by the first end device, one or more current situational factors of one or more of the exporter head-end device, the collector tail-end device, or the computer network, determine, by the first end device, that the sampling configuration needs to be dynamically adjusted to a new sampling configuration based on the one or more current situational factors, and cause, by the first end device, the exporter head-end device to exchange the telemetry traces according to the new sampling configuration.

In still other implementations, a tangible, non-transitory, computer-readable medium can have computer-executable instructions stored thereon that, when executed by a processor on a computer, cause the computer to perform a method comprising exchanging, by a first end device with a second end device, telemetry traces that are associated with spans of observability information within a computer network at a sampling configuration, the first end device being one of either an exporter head-end device or a collector tail-end device, determining, by the first end device, one or more current situational factors of one or more of the exporter head-end device, the collector tail-end device, or the computer network, determining, by the first end device, that the sampling configuration needs to be dynamically adjusted to a new sampling configuration based on the one or more current situational factors, and causing, by the first end device, the exporter head-end device to exchange the telemetry traces according to the new sampling configuration.

The techniques described herein, therefore, provide for observability data trace sampling based on infrastructure health and situational awareness. In particular, the techniques herein provide intelligent, infrastructure health aware and situationally aware methodologies for performing observability data sampling. Stated alternatively, the techniques herein provide for dynamic alteration of the sampling rate of observability data (e.g., metrics, events, logs, and traces (or "MELT data")) associated with OpenTelemetry data) based on health characteristics of the infrastructure, as well as components thereof. This can ensure that the quality of sampled observability data (e.g., MELT data, traces, spans, etc.) is maintained while ensuring that the observability system is not overwhelmed during periods of peak resource consumption.

Illustratively, the techniques described herein may be performed by hardware, software, and/or firmware, such as in accordance with the observability sampling process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the observability sampling process 248.

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the implementations have been shown and described herein with relation to specific network configurations (orientations, topologies, protocols, terminology, processing locations, etc.). However, the implementations in their broader sense are not as limited, and may, in fact, be used with other types of networks, protocols, and configurations.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
exchanging, by a first end device with a second end device, telemetry traces that are associated with spans of observability information within a computer network at a sampling configuration, the first end device being one of either an exporter head-end device or a collector tail-end device;
determining, by the first end device, one or more current situational factors of one or more of the exporter head-end device, the collector tail-end device, or the computer network;
determining, by the first end device, a trigger to dynamically adjust the sampling configuration to a new sampling configuration based on the one or more current situational factors; and
causing, by the first end device, the exporter head-end device to exchange the telemetry traces according to the new sampling configuration.

2. The method as in claim 1, wherein the one or more current situational factors comprise one or both of a health or a resource availability associated with one or more of the exporter head-end device, the collector tail-end device, or the computer network.

3. The method as in claim 2, wherein the new sampling configuration establishes one of either an increase or a decreasing to a sampling rate of the telemetry traces.

4. The method as in claim 1, wherein the one or more current situational factors comprise a prompt for additional data based on a level of escalation according to performance issues detected in the telemetry traces or the spans of observability data, or both.

5. The method as in claim 4, wherein the prompt for additional data is associated with one or more of: enablement of recording the spans of observability data, disablement of recording the spans of observability data, an increase in a sampling rate of the telemetry traces, a decrease in the sampling rate of the telemetry traces, filtering of collection of particular transaction types, or de-filtering of collection of particular transaction types.

6. The method as in claim 1, wherein the first end device comprises the exporter head-end device, and wherein causing the exporter head-end device to exchange the telemetry traces according to the new sampling configuration comprises:
adjusting one or more parameters associated with exchange of the telemetry traces according to the new sampling configuration.

7. The method as in claim 6, wherein the one or more current situational factors comprise one or more of: central processing unit usage and availability of the exporter head-end device, memory usage and availability of the exporter head-end device, network usage and availability, span creation and forwarding loads and rates, response times, component failure occurrences associated with the exporter head-end device, or partial success rates associated with the exporter head-end device.

8. The method as in claim 1, wherein the first end device comprises an observability agent.

9. The method as in claim 1, wherein the first end device comprises the collector tail-end device, and wherein causing the exporter head-end device to exchange the telemetry traces according to the new sampling configuration comprises:
requesting that the exporter head-end device adjust one or more parameters associated with exchange of the telemetry traces according to the new sampling configuration.

10. The method as in claim 9, wherein requesting comprises:
sending a hypertext transfer protocol response code message to the exporter head-end device.

11. The method as in claim 9, wherein the one or more current situational factors comprise one or more of: central processing unit usage and availability of the collector tail-end device, memory usage and availability of the collector tail-end device, network usage and availability, span ingestion loads and rates, span forwarding loads and rates, response times, component failure occurrences associated with the collector tail-end device, or partial success rates associated with the collector tail-end device.

12. The method as in claim 1, wherein the one or more current situational factors are selected from a group consisting of: round trip response times from components that indicate they are experiencing issues; OpenTelemetry responses that indicate failures or partial successes; collector scaling metrics; and collector health.

13. The method as in claim 1, wherein the observability information comprises one or more of OpenTelemetry data, metrics, events, logs, or traces.

14. An apparatus, comprising:
one or more network interfaces to communicate with a network;
a processor coupled to the one or more network interfaces and configured to execute one or more processes; and
a memory configured to store a process that is executable by the processor, the process, when executed, configured to:
exchange, as a first end device with a second end device, telemetry traces that are associated with spans of observability information within a computer network at a sampling configuration, the first end device being one of either an exporter head-end device or a collector tail-end device;
determine one or more current situational factors of one or more of the exporter head-end device, the collector tail-end device, or the computer network;
determine a trigger to dynamically adjust the sampling configuration to a new sampling configuration based on the one or more current situational factors; and
cause the exporter head-end device to exchange the telemetry traces according to the new sampling configuration.

15. The apparatus as in claim 14, wherein the one or more current situational factors comprise one or both of a health or a resource availability associated with one or more of the exporter head-end device, the collector tail-end device, or the computer network.

16. The apparatus as in claim 14, wherein the one or more current situational factors comprise a prompt for additional data based on a level of escalation according to performance issues detected in the telemetry traces or the spans of observability data, or both.

17. The apparatus as in claim 16, wherein the prompt for additional is associated with one or more of: enablement of recording the spans of observability data, disablement of recording the spans of observability data, an increase in a sampling rate of the telemetry traces, a decrease in the sampling rate of the telemetry traces, filtering of collection of particular transaction types, or de-filtering of collection of particular transaction types.

18. The apparatus as in claim 14, wherein the first end device comprises the exporter head-end device, and wherein the process, when executed, is configured to cause the exporter head-end device to exchange the telemetry traces according to the new sampling configuration by adjusting one or more parameters associated with the exchange of the telemetry traces according to the new sampling configuration.

19. The apparatus as in claim 14, wherein the first end device comprises the collector tail-end device, and wherein the process, when executed, is configured to cause the exporter head-end device to exchange the telemetry traces according to the new sampling configuration by requesting that the exporter head-end device adjust one or more parameters associated with the exchange of the telemetry traces according to the new sampling configuration.

20. A tangible, non-transitory, computer-readable medium having computer-executable instructions stored thereon that, when executed by a processor on a computer, cause the computer to perform a method comprising:
- exchanging, as a first end device with a second end device, telemetry traces that are associated with spans of observability information within a computer network at a sampling configuration, the first end device being one of either an exporter head-end device or a collector tail-end device;
- determining one or more current situational factors of one or more of the exporter head-end device, the collector tail-end device, or the computer network;
- determining a trigger to dynamically adjust the sampling configuration to a new sampling configuration based on the one or more current situational factors; and
- causing the exporter head-end device to exchange the telemetry traces according to the new sampling configuration.

* * * * *